Patented Oct. 31, 1950

2,527,525

UNITED STATES PATENT OFFICE 2,527,525

METHOD OF COAGULATING EMULSION POLYMERIZATES

Frederick W. Breuer, Lititz, Pa., assignor to Armstrong Cork Company, Lancaster, Pa., a corporation of Pennsylvania No Drawing. Application October 23, 1946, Serial No. 705,244

5 Claims. (Cl. 260—83.3)

This invention relates to a method of coagulating emulsion polymerizates. More particularly, this invention relates to a method of coagulating the synthetic latices obtained as a result of emulsion polymerization of unsaturated hydrocarbons in the production of synthetic rubber materials.

Synthetic rubbers have been advantageously prepared by emulsion polymerization of diolefins either alone or in the presence of other unsaturates such as styrene, acrylonitrile and the like. For instance, the synthetic rubber known as "Perbunan" is generally prepared by the emulsion polymerization of a mixture containing butadiene and acrylonitrile, whereas the synthetic rubber known as "Buna S" is generally prepared by the emulsion polymerization of a mixture containing butadiene and styrene. In addition to synthetic rubbers produced by the polymerization of butadiene, there are others resulting from processes involving polymerization of diolefins other than butadiene. Of these other synthetic rubbers those involving the polymerization of isoprene are of great importance. For example, valuable synthetic rubbers may be obtained by the emulsion polymerization of a mixture containing isoprene and styrene, or of a mixture containing isoprene and acrylonitrile.

In the production of synthetic rubber from the materials mentioned above, the starting material such as a mixture containing a conjugated diolefin and an unsaturated material capable of copolymerizing with the conjugated diolefin when emulsified with water are polymerized by preparing them as emulsions advantageously by the vigorous agitation of the polymerizable material with water in the presence of an emulsifying agent such as a soap, for example sodium oleate, sodium stearate and the like, salts of alkyl sulfates, such as sodium lauryl sulfate and the like, alkylated naphthalene sulfonates, such as butyl naphthalene sodium sulfonate and the like and allowing the polymerization to proceed either at room temperature or at elevated temperature and either with or without agitation. Examples of such copolymerizable substances are acrylonitrile, styrene, vinyl naphthalene, vinyl ketones, vinyl esters, acrylate esters and the like.

Generally speaking, the polymerization is conducted in the presence of a polymerization initiator, such as benzoyl peroxide, hydrogen peroxide, and the like.

At the end of the polymerization process as outlined above, a latex or emulsion containing rubber-like polymer or copolymer of the unsaturated material originally present is obtained.

It is generally the practice upon completion of the polymerization reaction to coagulate and thereafter work the polymer obtained to remove therefrom certain undesirable impurities which may be contained therein. Such impurities are generally in the form of significant quantities of catalyst, unpolymerized material, and the like. In order to successfully remove such material from the rubber-like polymer, it is highly desirable, if not necessary, to have the polymer in a form which may be readily subjected to washing or other operations to effect removal of undesirable impurities. Since this treatment is generally carried out on rather large batches of polymer, it is particularly advantageous to have the polymer in a subdivided form. If large lumps or a rather large mass of polymer is obtained following the coagulation, purification operations prior to vulcanization or other subsequent treating steps are made exceedingly difficult.

Various procedures have been advanced for coagulating emulsion polymerizates in the form of particles which may be readily treated. Such procedures are generally referred to as "crumbing" procedures. However, in many instances, the previously proposed procedures have effected coagulation by the use of substantial quantities of coagulating agents which may have a disadvantageous effect upon the final properties of the rubber or else such procedures are of such a nature as to be very difficult to carry out on a large scale.

It is accordingly an object of this invention to provide a simple method of coagulating emulsion polymerizates by means of agents which are readily available and which may be easily handled in the practice of the procedure.

Still another object of this invention is the provision of a simple method of effecting coagulation of emulsion polymerizates which method utilizes readily available coagulating agents and causes the formation of agents having beneficial effect upon the characteristics of coagulated rubber.

These and other objects of this invention will become apparent to those skilled in the art upon becoming familiar with the following description.

I have found that the synthetic rubber latices resulting from the emulsion polymerization of diolefins in the presence of material copolymerizable therewith and particularly those latices resulting from the polymerization of mixtures of isoprene with unsaturates such as styrene, acrylonitrile and the like may be coagulated into distinct particles which are readily worked by a process comprising providing in the latex an acidified brine.

The method of my invention is particularly applicable to latices having a pH greater than 7. In other words the method may be applied to latices prepared with anionic emulsifying agents such as soaps, aromatic sulfonates, salts of alkyl sulfates and the like.

In accordance with one modification of my invention, after the emulsion polymerization of diolefins alone or in admixture with unsaturates copolymerizable therewith has been completed to obtain a synthetic latex, coagulation of the latex is accomplished by adding to the latex a solution of sodium chloride or brine. In this modification of my invention, it is particularly advantageous to add the brine to the latex without agitation. The brine is added until not only a cream of synthetic rubber latex is obtained but the latex is completely coagulated as evidenced by the appearance of a clear serum. Generally this procedure results in a completely coagulated mass of latex. However, the mass is readily broken up by stirring. After stirring, a suitable acid is added and a crumb-like coagulum is obtained which does not coalesce into large lumps or into a single mass of material. Acidification with an acid either organic such as acetic or mineral such as sulfuric results not only in the formation of readily workable particles but also converts the soap present in the emulsion to fatty acids.

While the concentration of brine employed in this modification may be widely varied, generally speaking a 5% to 15% sodium chloride solution is adequate to coagulate the synthetic latex into a coagulum which is readily dispersible into crumb-like particles.

This modification of my invention is illustrated by the following specific examples:

Example I

To 540 volumes of a synthetic rubber latex prepared by the polymerization of 70 parts by weight of isoprene and 30 parts of weight of acrylonitrile with the aid of potassium persulfate in a soap emulsion and containing about 20% by weight of solids were added rapidly 500 volumes of a 10% sodium chloride solution. The resulting coagulated mass was then rapidly agitated to subdivide it, after which a 2% $H_2SO_4$ solution was added to obtain a finely divided coagulum of good sized particles and to convert the soap present into fatty acids. The resulting crumb was then separated from the remaining liquid.

In a particularly advantageous modification of my invention, a slightly acidified brine is added to an emulsion polymerized latex while stirring the latex. Generally speaking, in this modification of my invention, the pH of the brine must be maintained at at least 5. Although brines of higher acid concentration may be employed, at such higher acid concentrations a coherent mass of polymer may form which is exceedingly difficult to disperse. The acidified brine is added as indicated above with stirring until particles or crumbs appear. After the appearance of particles within the liquid, an acid such as acetic acid is added, while agitating the mass, in quantities sufficient to bring the pH of the mass to 2 or below.

Following the formation of crumbs as indicated above, the liquid may be readily separated by any suitable means as filtration or centrifugation and the subdivided particles subjected to further treatment for the removal of any undesired impurities which may be present therein.

This modification is illustrated by the following specific example.

Example II

To 540 volumes of a synthetic rubber latex prepared from 70 parts by weight of isoprene and 30 parts by weight of acrylonitrile with the aid of potassium persulfate in a soap emulsion and containing about 20% by weight of solids were added rapidly 300 volumes of a 10% sodium chloride solution acidified with acetic acid to a pH of 5 while stirring the latex by means of a stirrer rotating at 1700 R. P. M. The pH of the resulting mixture was thereby decreased to about 8. Creaming with a little coagulation took place. The creamed latex was coagulated to form crumbs by the gradual addition of 28 volumes of 2% by weight of $H_2SO_4$ solution. The resulting serum showed a pH of less than 5. A firm type of crumb was separated from the remaining liquid.

If desired, in the practice of my invention, the formation of a finely divided coagulum may be facilitated by admixing with the emulsion prior to the addition of salt solution or brine a dispersion of finely divided solids such as walnut shell flour, zinc oxide, carbon black, clays, etc. While the addition of a dispersion of such finely divided solids to the emulsion is advantageous, if desired, solid finely divided particles such as walnut shell flour may be dispersed directly into the emulsion thereby forming a dispersion therein. Following the addition of such finely divided material, treatment with brine either with or without agitation and treatment with acids such as acetic acid results in the formation of a coagulum of divided particles of a mixture of polymer and filler which may be readily processed in accordance with methods generally employed in the synthetic rubber industry. Such a procedure is advantageous in those instances where a dry type of crumb is desired. Such coagula may be advantageously used in the manufacture of various rubber products utilized in the drug industry.

While the quantity of brine added to the synthetic latex in the initial step of my process may vary depending, among other things, upon the particular monomers from which the synthetic latex is prepared, the proportions of monomers in the starting mixture, the percentage of solids present in the emulsion, and the like, in systems obtained by the polymerization of isoprene acrylonitrile mixtures and containing from about 15% to 50% solids, the volume of brine added is advantageously ½ to 1 times the volume of the latex.

Generally speaking, the solids content of the latex under treatment may vary over a wide range. However, in the modification of my invention involving treatment of an unstirred or substantially static latex with neutral brine, and thereafter acidifying the brine, it is particularly advantageous that the solids content of the latex is less than 20% by weight. This may be accomplished by adding water to the latex prior to coagulation in accordance with my invention. Also, generally speaking, when a neutral brine is added, a greater quantity is required than in the modification of my invention which embodies the addition of an acidified brine.

Generally speaking, in the practice of my invention in order to obtain a finely divided coagulum it is necessary that the serum remaining after addition of brine to the synthetic latex have a pH of at least 8. It has been found that when a pH less than 8 exists in the clear serum, a crumby coagulum cannot be obtained. Following the formation of a coagulum by the addition of brine, a suitable acid such as sulfuric acid may be gradually added to obtain a crumb-like coagulum and to convert the soap present to fatty acid. This conversion of soap to fatty acid results in a solution having a pH of approximately 2.8 to 3.0. The addition of acid is advantageously carried out gradually. The rate of addition is advantageously maintained between 5 cc. to 10 cc. per minute.

The acids employed in the practice of my invention may be organic or mineral. Mineral acids such as sulfuric, hydrochloric, phosphoric and the like may be employed advantageously in a diluted form. Of the organic acids, water soluble carboxylic acids are particularly effective. For instance, such carboxylic acids as formic, acetic, proprionic and the like may be used to advantage.

While my invention has been described with particular reference to the coagulation of a synthetic latex resulting from the copolymerization of isoprene with acrylonitrile, the invention is also applicable to the coagulation of other synthetic rubber latices. Broadly, the invention may be applied to any of the well-known synthetic rubber latices obtained by the polymerization of diolefins either alone or in the presence of other unsaturates containing a >C=C< linkage.

While the invention has been described with reference to certain particular embodiments and with reference to certain specific examples, these have been given by way of illustration. Therefore, changes, omissions, additions, substitutions, and/or modifications may be made within the scope of the appended claims without departing from the spirit of the invention, which is intended to be limited only as required by the prior art.

I claim:

1. A method of coagulating a synthetic latex resulting from the emulsion polymerization of a mixture containing isoprene and acrylonitrile which comprises incorporating in said latex an acidified brine having a pH higher than 5 while maintaining the pH of the mixture above 8.0, and thereafter reducing the pH of the resulting mixture to at least 2.

2. In the process of forming a finely divided coagulum from a diolefin polymer synthetic rubber latex which comprises adding to said latex an acidified brine having a pH higher than 5 while maintaining the pH of the mixture above 8.0 and thereafter treating the resulting mixture with an acid to reduce the pH of the resulting mixture to at least 2, the step comprising dispersing walnut shell flour in said latex prior to brine addition.

3. A method of coagulating a diolefinic polymer synthetic rubber latex into discrete particles which comprises adding to said latex an acidified brine having a pH higher than 5 under such conditions as to obtain a coagulum of discrete particles suspended in a liquid having a pH higher than 8.0, and thereafter reducing the pH of said liquid to at least 2 with acetic acid.

4. A process of coagulating a synthetic rubber latex obtained by the emulsion polymerization of isoprene and acrylonitrile in the presence of a soap and which contains 15% to 50% solids which comprises slowly adding to said latex with agitation ½ to 1 volume of an acidified brine having a pH of approximately 5 while maintaining the pH of the mixture above 8.0, and thereafter reducing the pH of the resulting mixture to at least 2 thereby destroying the soap content thereof.

5. A method of coagulating a diolefin polymer synthetic rubber latex into discrete particles which comprises adding to said latex an acidified brine having a pH higher than 5 under such conditions as to obtain a coagulum of discrete particles suspended in a liquid having a pH higher than 8.0, and thereafter reducing the pH of said liquid to at least 2.

FREDERICK W. BREUER.

REFERENCES CITED

The following references are of record in the file of this patent:

UNITED STATES PATENTS

| Number | Name | Date |
|---|---|---|
| 1,953,972 | Murphy et al. | Apr. 10, 1934 |
| 2,161,949 | Calcott et al. | June 13, 1939 |
| 2,378,695 | Fryling | June 19, 1945 |
| 2,414,803 | D'Alelio | Jan. 28, 1947 |
| 2,419,512 | Vesce | Apr. 22, 1947 |

OTHER REFERENCES

Ser. No. 330,310, Ludwig et al. (A. P. C.), published Apr. 20, 1943.

Certificate of Correction

Patent No. 2,527,525                                                 October 31, 1950

FREDERICK W. BREUER

It is hereby certified that error appears in the printed specification of the above numbered patent requiring correction as follows:

Column 3, line 44, for "of weight" read *by weight*; column 6, line 10, for "diolefinic" read *diolefin*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*